Jan. 17, 1928.

R. W. SNYDER 1,656,874

METHOD OF AND APPARATUS FOR VULCANIZING RUBBER ARTICLES

Filed April 7, 1927   2 Sheets-Sheet 1

INVENTOR
Robert W. Snyder.
BY
R. O. Trogner
ATTORNEY

Jan. 17, 1928.  1,656,874
R. W. SNYDER
METHOD OF AND APPARATUS FOR VULCANIZING RUBBER ARTICLES
Filed April 7, 1927    2 Sheets-Sheet 2

INVENTOR
Robert W. Snyder.
BY
ATTORNEY

Patented Jan. 17, 1928.

1,656,874

UNITED STATES PATENT OFFICE.

ROBERT W. SNYDER, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR VULCANIZING RUBBER ARTICLES.

Application filed April 7, 1927. Serial No. 181,749.

My invention relates to the vulcanization of rubber and it has particular relation to a continuous method of vulcanizing articles and to an apparatus for practising the method.

One object of my invention is to provide a method by which rubber articles are moved continuously through a heated liquid maintained under considerable pressure.

Another object of the invention is to provide an apparatus through which a plurality of vulcanizable articles are adapted to be moved continuously and under fluid pressure.

The tendency in the rubber industry is to employ, in so far as practicable, continuous processes for the manufacturing of products. In accord with this tendency numerous inventors have devoted much time to the development of vulcanizers through which rubber articles can be moved in a continuous, uninterrupted train. One of the difficulties encountered in the devices thus far suggested has been the lack of any means for maintaining adequate pressure within a heating chamber while articles are being conveyed into and from such chamber. Pressure in the chamber is very desirable as it tends to compact the rubber and to cause it to fill all corners and depressions in a mold. Furthermore, a uniform temperature, which is necessary to the proper vulcanization of rubber, can be maintained more efficiently by employing vulcanizers that are provided with compression chambers.

Figure 1:
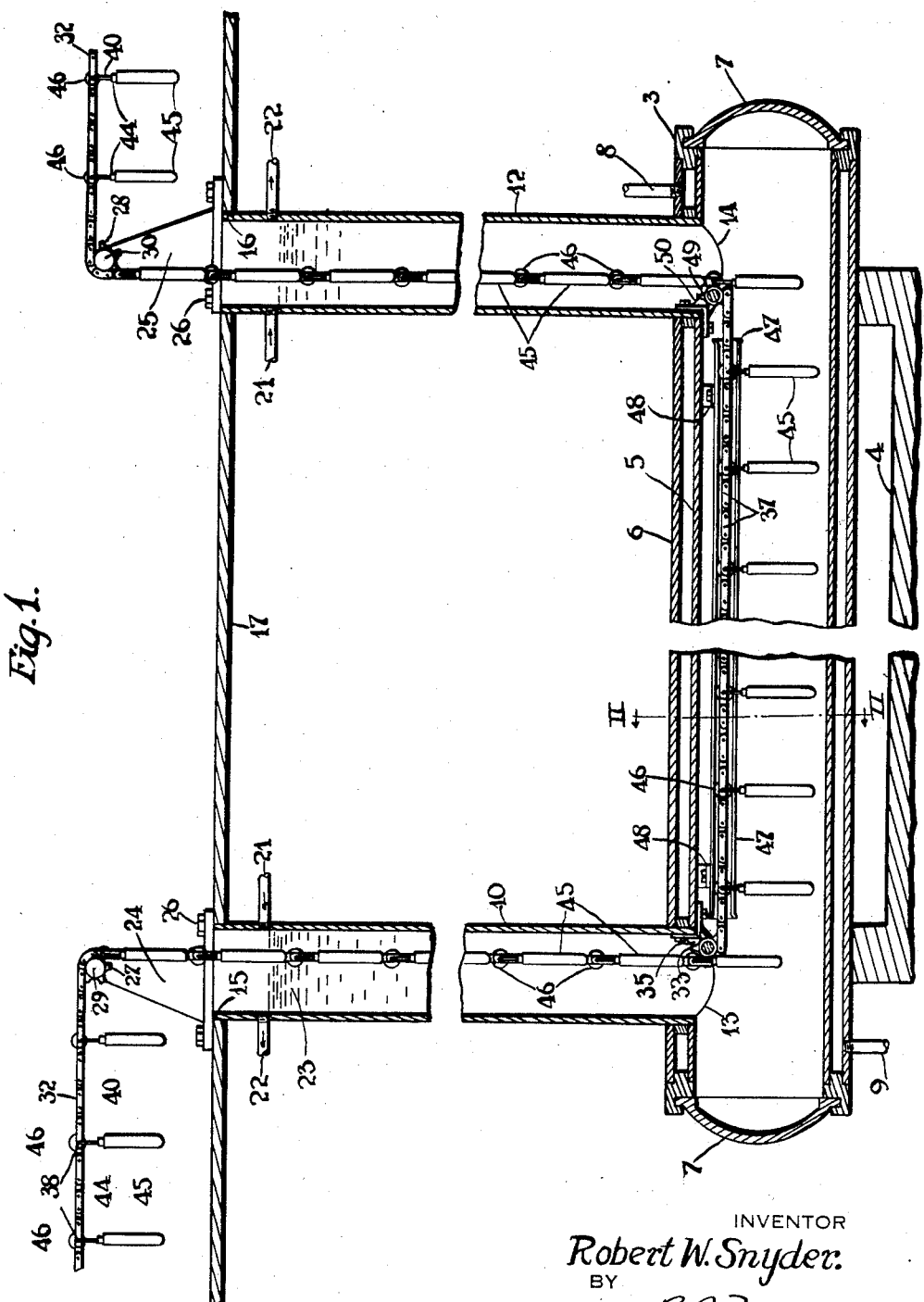
Figure 2:
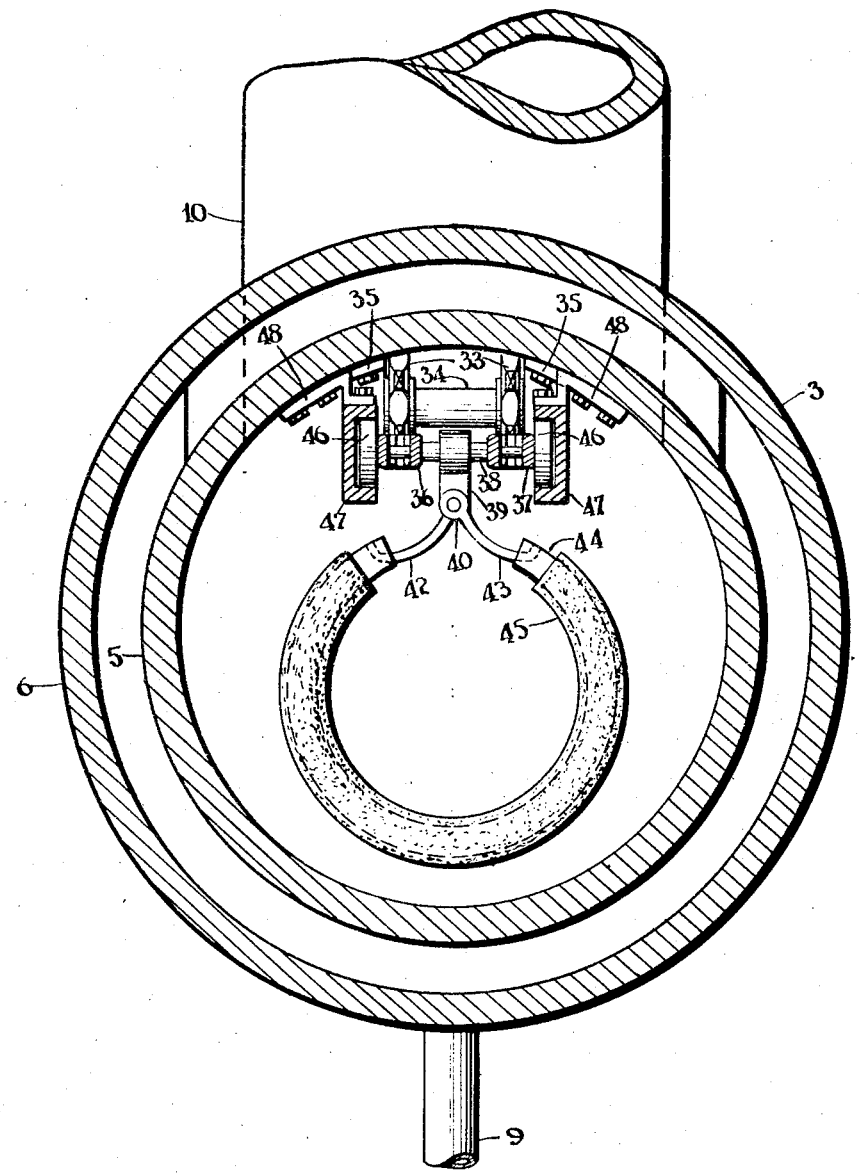

For a better understanding of my invention reference may now be had to the accompanying drawings forming a part of this specification, of which;

Fig. 1 is a vertical longitudinal sectional view showing the interior construction of my improved vulcanizer; and Fig. 2 is a cross-sectional view taken substantially along the line II—II of Fig. 1.

Referring to the drawings in detail, a horizontal heater 3, which rests upon a floor or foundation 4, comprises an inner shell 5, an outer shell or steam jacket 6 and oppositely disposed heads 7. Live steam is directed into the chamber between the shells through an inlet pipe connection 8 and the exhaust steam and condensate escapes from the chamber through an exhaust pipe connection 9.

Vertically disposed stand pipes 10 and 12, which are identical in design, are connected adjacent the opposite ends of the heater 3 and communicate with the interior thereof through openings 13 and 14. The stand pipes extend upwardly through openings 15 and 16 that are provided in a platform or ceiling 17. Near the upper extremities of the stand pipes inlet pipe connections 21 and outlet pipe connections 22 are provided which permit curing liquid indicated at 23 in the stand pipes to be maintained at a constant level determined by the level of the pipes 22. The tops of the stand pipes are shown as being substantially level with the ceiling 17. However, they might well extend above or terminate below the ceiling, depending of course upon the height thereof and the pressure desired in the heater.

A plurality of brackets 24 and 25 are bolted, as indicated at 26, to the ceiling 17 adjacent the upper portions of the stand pipes. The upper portion of the brackets support sprocket wheels 27 and 28 which are journaled upon stud shafts 29 and 30. It is to be understood that a sprocket wheel is disposed at each side of the upper portion of each stand pipe.

An endless conveyor belt 32 is trained over the sprockets 27 and extends downwardly through the stand pipe 10 to additional sprockets 33 which are secured to a transversely disposed bar or shaft 34, the latter being mounted upon the brackets 35 which are rigidly secured, adjacent the opening 13, to the upper inner portion of the heater 3. As best shown in Fig. 2, the chain conveyor is composed of spaced parallel chain links 36 and 37 which are connected together and maintained in parallel relation by means of transversely disposed bearing shafts 38. These shafts are spaced at convenient intervals along the length of the chain and extend in opposite directions through respective links 36 and 37, in which they are journaled. A bracket 39 is rigidly secured to an intermediate portion of each shaft 38 and it pivotally supports, at its lower extremity, a hook 40 having oppositely extending arms 42 and 43, which are adapted to extend within the opposite end portions of a hollow incomplete circular mandrel 44 that is supported thereby. A vulcanizable article 45, composed of rubber compound, is formed upon each mandrel 44.

Each end of the shaft 38 rotatably supports a roller or wheel 46 which is adapted to roll upon a horizontal channeled track 47 rigidly secured by means of brackets 48 to the upper inner portion of the heater 3 and they extend substantially the distance between the openings 13 and 14. A sprocket 49 rotatably supported by a bracket 50 is operatively mounted adjacent the opening 14 and operates in the same manner as the sprocket 33. The chain conveyor is trained about the sprocket 49 and extends upwardly through the stand pipe 12 and over the sprocket 28.

Although only a section of the chain conveyor 32 is shown, it is to be understood that it extends in a horizontal direction away from the brackets 24 and 25 to suitable loading and unloading platforms, not shown.

When the vulcanizer is being used, the heater and stand pipes are filled to the level of pipes 21 and 22 with a curing liquid such as water. Since the stand pipes 10 and 12 are of considerable height the liquid within the heater 3 is maintained under adequate pressure. Also, since hot water from the heater rises in the stand pipes, when it reaches the surface of the liquid, the reduced pressure may cause it to boil and give off an undue amount of steam. This condition may be obviated by maintaining a constant flow of cool liquid across the level of the liquid in the stand pipes from inlet 21 to outlet 22.

The liquid in the heater is warmed by conduction of heat from the steam which enters through the pipe connection 8 into the steam chamber between the shells 5 and 6. The heat is then carried by convection to the rubber articles 45 on the conveyor. Since the liquid is under considerable hydrostatic pressure caused by the columns of liquid in the stand pipes, it is possible to raise the pressure much above the boiling point of the liquid at normal pressure. At the same time that this advantage is secured it is possible to maintain a continuous forward movement of the articles which are to be vulcanized.

From the foregoing description it will be apparent that my invention provides for a practicable method and apparatus for vulcanizing rubber articles, and that the advantages of constant liquid pressure upon such articles as they are being vulcanized are attained without interfering with the continuous movement of the articles into and from the vulcanizing medium.

Although I have illustrated but one form which my invention may assume and have described in detail but a single application thereof it will be apparent to those skilled in the art that it is not so limited but that various minor modifications and changes may be made therein without departing from the spirit of the invention or from the scope of the appended claims.

What I claim is:

1. A vulcanizing apparatus comprising an entrance stand pipe section, a horizontal heater section, an exit stand pipe section, said pipes and heater being adapted to be filled with curing liquid, and means for continuously moving articles downward through one pipe forward through the heater and upward through the second pipe.

2. A vulcanizing apparatus comprising an elongate heater, means for maintaining a hydrostatic head of pressure corresponding to the normal pressure employed in vulcanizing rubber articles, and means for continuously moving the articles into, through, and away from said heater, the movement into and away from the heater being through the means for maintaining hydrostatic pressure.

3. An apparatus for vulcanizing rubber articles, comprising a horizontal heater adapted to contain curing liquid, means for maintaining a constant pressure in said heater and means for continuously moving a procession of rubber articles through the heater and the means for maintaining the pressure.

4. The method of curing rubber articles comprising continuously moving the articles downward through a curing liquid until the desired curing pressure is established on the articles, then moving the articles through the liquid at that depth until the articles are sufficiently cured, and then raising the articles from the liquid.

5. The method of vulcanizing rubber articles that comprises moving the articles horizontally through a heated curing liquid, the introduction and withdrawal of the articles being effected through an open column of liquid of sufficient depth to maintain a proper vulcanizing pressure in the liquid.

Signed at Akron, in the county of Summit, and State of Ohio, this 6th day of April, 1927.

ROBERT W. SNYDER.